Patented June 8, 1926.

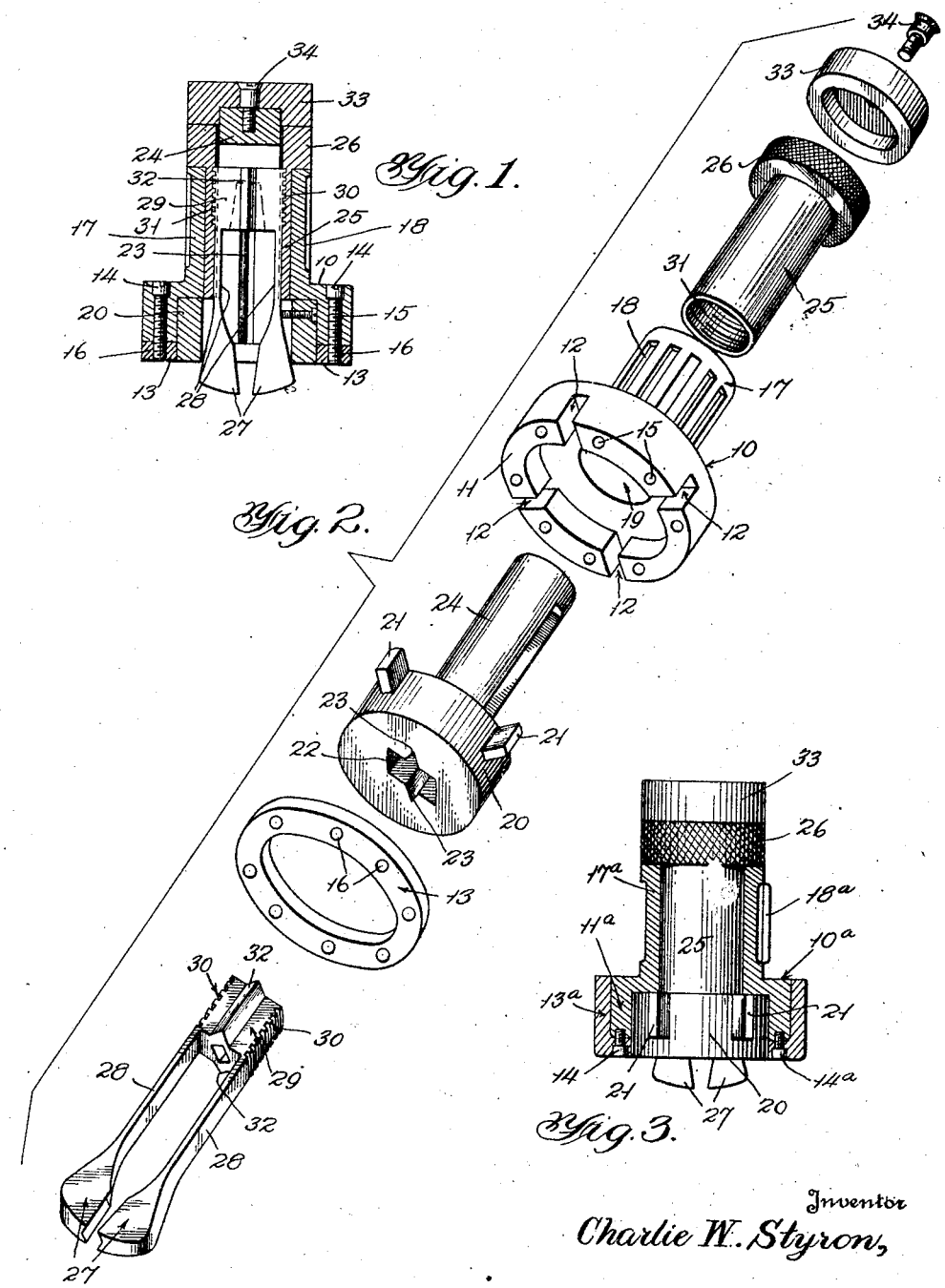

1,588,281

UNITED STATES PATENT OFFICE.

CHARLIE W. STYRON, OF MOREHEAD CITY, NORTH CAROLINA.

REMOVABLE BIT CHUCK FOR DIE HEADS.

Application filed March 27, 1924. Serial No. 702,267.

My present invention relates generally to drill and similar tool chucks and more particularly to means whereby such a chuck may be formed in combination with a die head ordinarily employed for holding threading dies or bits. My invention proposes means applicable to a die head of the type just mentioned whereby the latter may be transformed temporarily or permanently into a chuck for holding drills, reamers, taps and the like and my primary object is the provision of such chuck forming means applicable to a die head upon removal of its usual threading bits and without requiring other changes or reconstruction of the head and also without impairing the latter for subsequent use in its usual and ordinary functions.

According to my invention in a general way chuck forming means are proposed including adjustable jaws and a jaw holder together with jaw adjusting means in connection with the holder, the holder and its parts being shaped to interfit a die head and being provided with means adapted to coact with the usual bit seats in order to effect a driving connection between the die head and the jaw holder. These several parts are such that they may be readily associated with a die head upon removal of its usual threading bits so that the chuck may support a drill, reamer, tap or the like for operation through the ordinary actuation of the die head, and the parts are furthermore associated with the die head in such manner that they may be readily removed and the die head used for its ordinary purposes without difficulty.

In the accompanying drawing which illustrates my present invention and forms a part of this specification, Figure 1 is a central longitudinal section through a die head equipped with the improvements proposed by my invention, Figure 2 is a perspective view showing the several parts of the die head and my invention as applicable thereto, in detached relation, and Figure 3 is a central longitudinal section through a slightly different form of die head.

Referring now to these figures and particularly to Figures 1 and 2 I have shown a die head 10 having a circumferential flange 11 therearound which is radially slotted as at 12, the radial slots 12 forming seats for the threading dies or bits, which are confined by a clamping ring 13 which in the connected position is seated against the flange 11 and secured to the latter by a series of clamping screws 14 whose heads are countersunk in the die head, these screws extending through apertures 15 in the die head and into threaded apertures 16 of the clamping ring. It is thus obvious that upon removal of the clamping ring 13, the bits may be removed from the slots or bit seats 12. This die head also has a cylindrical extension 17 provided with a circumferential series of lengthwise grooves 18 which in practice coact with dogs or pawls in the die head holder or handle in order to complete the ratchet connection. This cylindrical extension 17 also has a lengthwise bore 19 one end of which opens into the head 10 within the flange 11.

In Figure 3 I have shown a slightly different form of die head $10^a$, which employs a flanged clamping ring $13^a$ around the periphery thereof, held in place by clamping screws $14^a$ through the flange of this clamping ring and into the flange $11^a$ of the die head. The flange $11^a$ is, however, radially slotted to form bit seats the same as the die head 10 of Figures 1 and 2 and the die head $10^a$ of Figure 3 also has a cylindrical extension $17^a$ provided with a lengthwise bore and having an annularly grooved external surface provided with lengthwise ribs $18^a$ at circumferentially spaced points so as to permit of the completion of a ratchet connection between the die head and its holder or handle in use.

According to my invention the chuck forming means, applicable with equal facility to the die head 10 of Figures 1 and 2 and the die head $10^a$ of Figure 3, consist of a circular jaw holder 20 formed to snugly interfit the space of the die head within its radially slotted flange, this jaw head being provided with radially outstanding lugs 21 adapted to project into the die head flange slots in order to complete a driving connection between the die head and the jaw holder. The jaw holder 20 is also provided with a rectangular axial opening 22 and with V-shaped grooves 23 at opposite sides of the opening 22, both the opening 22 and grooves 23 being extended through a cylindrical extension 24 of the jaw holder which is of substantially reduced diameter with respect to the bore of the die head extension and is adapted to receive thereover the sleeve portion 25 of a jaw adjusting member also including a knurled ring 26 at one end of the sleeve. In assembling the jaw holder and jaw adjusting member the former is projected into the bore of the die head extension through the die head while the sleeve 25 is extended into the die head extension from its opposite end and telescopes the extension 24 of the jaw holder, the sleeve 25 movably interfitting the bore of the die head extension. In this way the knurled adjusting ring 26 abuts the opposite end of the die head extension with respect to the die head itself as plainly seen in Figures 1 and 3.

The jaws 27 of the chuck are formed upon the adjacent ends of a pair of spring arms 28 projecting in approximately parallel relation from and preferably integral with a block 29 of rectangular form having at opposite sides threads 30 to cooperate with the internal threads 31 of the adjusting sleeve 25 and also having V-shaped ribs 32 to cooperate with the V-shaped grooves 23 of the jaw holder previously mentioned. It will be noted that the block 29 is generally shaped to movably interfit the axial opening 23 of the jaw holder and is of slightly greater width in one direction than the diameter of the jaw holder extension 24 so that the threaded portions 30 thereof project slightly beyond the surface of the extension 24 for effective engagement by the internal threads 31 of the adjusting sleeve 25. It will also be noted that the jaws 27 are formed by enlargements at the free ends of the spring arms 28 so that as the jaw block with the jaws is drawn into the jaw holder the jaws 27 will be gradually forced together by virtue of engagement with the side walls of the opening 22 of the jaw holder. It is obvious that this is accomplished by rotating the knurled ring clockwise, while counter-clockwise movement of the knurled ring forces the jaws outwardly so that they may spread farther apart.

With the parts assembled as previously described and with the jaws and jaw block extended into the jaw holder and its extension 24 and effectively engaged by the sleeve 25, the assembly is completed by a flanged cap 33 which extends over the free end of the jaw holder extension 24 and against the knurled adjusting ring 26, this cap being held in place by a screw 34 which extends axially therethrough and threads axially into the end of the jaw holder extension 24. The screw 34 is preferably shouldered in order that it may be turned tightly against the jaw holder extension 24 without binding the cap 33 against the adjusting ring 26.

Thus from the foregoing the construction and operation of the several parts of the invention may be readily understood and appreciated and it becomes apparent that they are not only applicable with equal facility to the slightly varying types of die heads shown in Figures 1 and 3 but are also adapted to effectively and efficiently carry out the objects first above stated.

I claim:

1. Chuck forming means applicable to die heads having radial bit seats, said means including a holder having radially outstanding lugs adapted to engage said seats and a cylindrical extension, the said holder and its extension being longitudinally slotted, jaws adjustable in the slot of the holder, having a threaded portion movable in the slot of the holder extension and projecting therefrom at diametrically opposite points, an adjusting member including an adjusting ring and a sleeve telescoping the holder extension, the ring cooperating with said cylindrical extension and the sleeve being internally threaded to engage the threaded portions of the jaw, and means to support the said adjusting member against longitudinal displacement with respect to the holder.

2. Chuck forming means for die heads having radial bit seats, said means including a lengthwise slotted holder having radially outstanding lugs adjacent to one end adapted to engage said seats, jaws movable lengthwise and non-rotatable in the slot of the holder, and an adjusting member rotatable on the holder and held against lengthwise displacement with respect thereto, the said adjusting member and said jaws having relatively engaging threaded portions as described.

3. Chuck forming means for die heads having radial bit seats, said means including an axially slotted holder having radially outstanding lugs adapted to engage said seats and having a lengthwise slotted cylindrical extension, jaws movable through the slot of the holder and within the slotted extension thereof, and an adjusting member on the extension of the holder having means engaging the jaws to shift the latter in the said holder.

In testimony whereof I hereunto affix my signature.

CHARLIE W. STYRON.